United States Patent [19]

West, Jr.

[11] Patent Number: 5,208,854
[45] Date of Patent: May 4, 1993

[54] PICTURE CARRIER CONTROLLED AUTOMATIC GAIN CONTROL CIRCUIT FOR CABLE TELEVISION INTERDICTION OR JAMMING APPARATUS

[75] Inventor: Lamar E. West, Jr., Rte. 2, Box 377, Maysville, Ga. 30558

[73] Assignee: Scientific-Atlanta, Inc., Atlanta, Ga.

[21] Appl. No.: 446,603

[22] Filed: Dec. 6, 1989

Related U.S. Application Data

[63] Continuation-in-part of Ser. No. 166,302, Mar. 10, 1988, Pat. No. 4,912,760, and a continuation-in-part of Ser. No. 279,619, Dec. 5, 1988.

[51] Int. Cl.$^5$ .................................. H04N 7/167
[52] U.S. Cl. ............................ 380/7; 455/233.1; 455/234.1
[58] Field of Search ............... 350/7; 455/233, 234, 455/240, 246, 247

[56] References Cited

U.S. PATENT DOCUMENTS

| | | |
|---|---|---|
| Re. 29,997 | 5/1979 | den Toonder . |
| 3,202,758 | 8/1965 | Brownstein . |
| 3,760,097 | 9/1973 | Burroughs et al. . |
| 3,896,262 | 7/1975 | Hudspeth et al. . |
| 3,899,633 | 8/1975 | Sorenson et al. . |
| 3,989,887 | 11/1976 | Murphy . |
| 4,024,575 | 5/1977 | Harney et al. ............... 380/7 |
| 4,039,954 | 8/1977 | den Toonder . |
| 4,091,413 | 5/1978 | Herman . |
| 4,148,064 | 4/1979 | Reed . |
| 4,225,976 | 9/1980 | Osborne et al. ............... 455/226 |
| 4,245,245 | 1/1981 | Matsumoto et al. ............... 380/20 |
| 4,326,289 | 4/1982 | Dickinson . |
| 4,334,322 | 6/1982 | Clark, III . |
| 4,342,119 | 7/1982 | Seidl . |
| 4,343,042 | 8/1982 | Schrock et al. . |
| 4,367,557 | 1/1983 | Stern et al. . |
| 4,434,436 | 2/1984 | Kleykamp et al. . |
| 4,450,481 | 5/1984 | Dickinson . |
| 4,498,193 | 2/1985 | Richardson . |
| 4,521,809 | 6/1985 | Bingham et al. . |
| 4,636,852 | 1/1987 | Farmer . |
| 4,651,204 | 3/1987 | Uemura . |
| 4,686,564 | 8/1987 | Masuko et al. . |
| 4,769,838 | 9/1988 | Hasegawa . |
| 4,792,971 | 12/1988 | Uemura . |
| 4,825,468 | 4/1989 | Ellis . |
| 4,827,511 | 5/1989 | Masuko ............... 380/15 |
| 4,829,593 | 5/1989 | Hara ............... 455/234 |
| 4,837,820 | 6/1989 | Bellavia, Jr. . |
| 4,841,569 | 6/1989 | Wachob . |
| 4,903,297 | 2/1990 | Rist et al. . |
| 4,912,760 | 3/1990 | West, Jr. et al. . |

FOREIGN PATENT DOCUMENTS

| | | |
|---|---|---|
| 178758 | 4/1986 | European Pat. Off. . |
| 5961384 | 4/1984 | Japan . |

OTHER PUBLICATIONS

"TGT-The Affordable Solution" (article), AM Cable TV Industries, Inc.
"Addressable Tap IT-1-SM" (article), Control Com Inc.
"Tier Guard" (article), E-Com Corporation.

*Primary Examiner*—Linda J. Wallace
*Attorney, Agent, or Firm*—William A. Marvin

[57] ABSTRACT

An off-premises i.e. a negative or positive trap, jamming cable television or interdiction system, includes a picture carried controlled automatic gain control circuit. A broadband television signal output of a variable gain device is distributed by a radio frequency signal splitter to a number of subscribers. A portion of the output of the variable gain device comprising at least two contiguous television channels is passed to a power level detector. A detected power level is compared with a predetermined power level reference for adjusting the gain of the variable gain device. The predetermined power level reference is set to equal the attenuation between the off-premises equipment and the subscriber premises plus the desired level at the entrance to the subscriber's premises. The power level of a jamming or interdicting signal for denying access to unauthorized television programs is set to fall within a predetermined range of power levels related to the predetermined power level reference.

17 Claims, 8 Drawing Sheets

PICTURE CARRIER CONTROLLED AUTOMATIC GAIN CONTROL CIRCUIT FOR CABLE TELEVISION INTERDICTION OR JAMMING APPARATUS

CROSS-REFERENCE TO RELATED APPLICATIONS

This application is a continuation-in-part of U.S. Pat. No. 4,912,760, issued Mar. 27, 1990, and Ser. No. 279,619 and Ser. No. 166,302, filed Mar. 10, 1988 and Dec. 5, 1988 respectively, and entitled "Off-Premises Cable Television Channel Interdiction Method and Apparatus," and is related by subject matter to the following U.S. patent applications filed concurrently herewith: U.S. application Ser. No. 446,602 entitled "Optimum Amplitude and Frequency of Jamming Carrier in Interdiction Program Denial System", U.S. application Ser. No. 446,604 entitled "CATV Subscriber Disconnect Switch," and U.S. application Ser. No. 446,695 entitled "CATV Reverse Path Manifold System."

BACKGROUND OF THE INVENTION

1. Technical Field

This invention relates to cable television channel interdiction systems and, more particularly, to a method and apparatus for controlling gain in such systems when a jamming carrier amplitude level must be matched to a picture carrier amplitude level.

2. Description of the Prior Art

At a headend of a cable television system, a scrambler is normally provided to encode premium television channels. The applied scrambling precludes reception by an unauthorized converter/decoder at a connected premises. Data representing channels or tiers of programming are addressably transmitted to a particular converter/decoder and stored in an authorization memory. As a result of the addressed transmission, a subsequently transmitted program is authorized in that the decoder portion of the converter/decoder will be selectively enabled to decode the scrambled premium channel or program.

Several varieties of scrambling techniques are applied today. Each manufacturer has its own scheme which may be incompatible with others. Nevertheless, most popular scrambling systems today are based on sync suppression, in which the sync information is hidden from the television receiver's sync separator, usually by moving it to a level occupied by picture information (moving the sync tip to an equivalent picture level of 40 IRE units is common). Some systems modulate the picture carrier with a sine wave phased to suppress the horizontal blanking interval. Most systems today switch to the suppressed level at the beginning of the blanking interval and switch out at the end. Most through not all suppress the vertical blanking interval. Some systems dynamically invert the video, either on a line-by-line or a field-by-field basis. This must be done carefully to avoid artifacts caused by inverting and reinverting around different levels, or by differential gain and phase of the system. Synchronization is restored either by the provision of synchronous amplitude modulated pulses on the sound carrier, by digital information placed in the vertical interval or by phase modulation on the picture carrier.

The provision of one scrambler per premium channel at the headend and the inclusion of a descrambler in each converter/decoder at the premises of the television receiver is particularly expensive. Furthermore, providing the converter/decoder on premises has turned out to be a great temptation to service pirates who imaginatively seek ways to receive premium channels. As a result, cable television equipment manufacturers have entered into a veritable war with such pirates resulting in complicated service authorization protocols in some instances involving multiple layers of encryption by both in-band and out-of-band data transmission further increasing the costs of the converter/decoder.

Furthermore, all scrambling systems leave artifacts in the horizontal blanking interval in the form of steps on the front and back porches. Normally these are not a problem, but if a television receiver does not have adequate overscan, then the steps can show up as light bars on one or both sides of the picture. Further, if a television receiver uses back porch sampling for automatic gain control and/or black level restoration, and the sampling period extends into the time of the descrambling step, the television will show the wrong black level and may show flicker in the picture. In systems in which pulse trains are applied to the sound carrier, a buzz carried by harmonics of a 59.94 Hz signal can be noticed in some television receivers.

Consequently, the cable industry has resorted to look for new technology and to take a second look at technology developed in the early stages of development of cable television such as the application of negative and positive traps and more recent techniques such as interdiction.

Negative trap technology is viewed by many manufacturers as a viable alternative to sync suppression scrambling methods. A negative trap is basically a narrow band reject filter. Traps are located at the drop to a subscriber's dwelling and attenuate a significant portion of a premium television channel rendering that channel unusable by the subscriber.

In the conventional embodiment, negative traps are made using L-C filter techniques. The result is a notch with finite quality Q and finite shape factor. In the case of a single channel negative trap, the center of the notch is usually located at the picture carrier frequency of the channel to be removed. This technique, sometimes called a static negative trap, requires attenuation at the picture carrier of at least 60 dB to be effective.

Negative trap systems have several advantages that make them attractive for cable television applications. One primary advantage is the ability to deliver a broadband cable television spectrum to the subscriber's converter/decoder. Conventional sync suppression systems utilize descrambling set-top converter/decoders which deliver inherently narrowband signals. Negative traps are usually mounted outside the subscriber's home (typically at the tap) and thereby minimize the exposure associated with placing hardware inside the subscriber's dwelling. Finally, some cable television operators view the negative trap as a more secure means of subscriber control than is sync suppression, as picture reconstruction is viewed as substantially more difficult.

However, the negative trap system requires hardware in locations where no revenue is generated for the cable television system. Moreover, negative traps have several severe practical limitations. L-C band reject filters have Q and shape factor limitations. Quality factors Q for L-C filters are typically limited to less than 30. This means that for a negative trap located at channel 8 (picture carrier at 181.25 MHz) the 3 dB bandwidth of a negative trap is typically 6 MHz (or the bandwidth of a baseband television channel). This trap would result in significant deterioration of the lower adjacent channel. Then the television receiver tuned to the lower adjacent channel, rather than having to contend with a 15 dB picture-to-sound ratio, may have to contend with a sound carrier reduced an additional 6 dB or so. Frequency stability as a function of time and temperature is also a significant concern. Many cable television system operators have instituted a regular negative trap change-out program based on the assumption that after a certain period of time and temperature cycling, frequency drift will render negative traps useless.

Cascadability is another significant concern. Finite return loss and non-zero insertion loss limit the number of single channel negative traps which can be cascaded. As the number of services to be secured increases, the negative trap decreases in appeal. Moreover, a change in a channel line-up requires a significant investment in hardware and manpower in this scenario.

Recently, a new type of negative trap has been introduced. The dynamic negative trap consists of a notch filter that is designed to be modulated with respect to frequency. The notch is centered about the picture carrier but is deviated slightly from side to side. The television channel is rendered unusable by the introduction of unwanted amplitude and phase modulation on the picture carrier. This technique requires a notch depth significantly less than that of static negative traps (typically 40 dB). Additionally, the intentionally introduced frequency modulation reduces somewhat the requirement for frequency stability.

The dynamic negative trap, however, has several disadvantages. A power source is required in order to accomplish the frequency modulation. More significant is the parasitic modulation that the technique produces on the adjacent television channels.

Positive trap systems also utilize a narrow band-rejection notch filter. However, unlike negative trap systems which are used to attenuate or trap a premium channel transmission, the notch filter is used to restore the premium television channel. In this scenario, an interfering signal is placed inside the premium television channel at the cable television headend. This interfering signal is then removed at the subscriber's dwelling by use of the notch filter. Ideally this notch filter removes only the interference without removing a significant amount of television information.

The positive trap technique is seen as having several advantages by the cable television system operator. It is considered advantageous to have the interference present in the secured channels on the cable television distribution plant (unlike the negative trap system in which the channels to be secured are "in the clear" on the distribution plant). It is very attractive from a financial standpoint to require subscriber hardware only at those locations where a subscriber wishes to receive a secure service. Thus, any capital investment is associated with a point of revenue generation.

The conventional embodiment of the positive trap system utilizes L-C notch filters to remove the interfering signal. These L-C notch filters suffer from the same limitations as do L-C negative traps discussed above. Consequently, L-C based positive traps are limited to the lower end of the cable television spectrum. Quality Q and shape factors have also restricted the number of locations for the interfering signal within the television channel.

The location for the interfering signal in the conventional embodiment of the positive trap system is midway between the picture carrier and sound carrier. The energy density (and hence information density) in this area of the spectrum is relatively low. One reason this location was chosen was that it minimized the impact of any television information removed along with the interfering signal by the notch filter, and thereby improved the quality of the recovered television signal. It would be expected that the jamming carrier would normally have minimal effect on the adjacent channel television picture unless a television has unusually poor rejection 2.25 MHz above the picture carrier. The jammer does add another carrier which the tuner will have to contend with, which might cause some degradation in a marginally overloaded case.

Despite this location, the quality Q and shape factor limitations of conventional L-C positive traps do remove a significant amount of useful television information. The result is a noticeable "softening" of the television picture as a result of attenuation of high frequency information. Predistortion at the headend can improve this performance but falls far short of being able to correct it completely. This location for the interfering signal also facilitates the job of the video pirate. This pirate can easily tolerate a degraded signal and hence can recover a useable picture using techniques easily available (such as the classic twin lead quarter wave stub with an aluminum foil slider for the fine tuning). Also, positive trap systems require a higher per premium channel cost than a negative trap system.

Parallel to developments of different types of trapping or jamming systems, the cable industry has also evidenced a requirement to move a converter or descrambler outside of a subscriber's home to a location which is more secure from signal piracy. For example, an addressable tap system was developed by Scientific Atlanta in 1983 or 1984 in which an off-premises "tap", addressed by a headband control system, gates a premium channel into the subscriber's premises. However, such products did not prove to be viable alternatives to inside-the-home signal descrambler/converters.

A relatively recent technique for premium channel control is the interdiction system, so-called because of the introduction of an interfering signal at the subscriber's location. Most embodiments consist of a pole-mounted enclosure located outside the subscriber's premises designed to serve four or more subscribers. This enclosure contains at least one microprocessor controlled oscillator and switch control electronics to secure several television channels. Control is accomplished by injecting an interfering or jamming signal into unauthorized channels from this pole-mounted enclosure.

For efficiency's sake, it is known to utilize one oscillator to jam several premium television channels. This technique not only reduces the amount of hardware required, but also maximizes the system flexibility. The oscillator output jamming signal frequency is periodically moved from channel to channel. Consequently, the oscillator is frequency agile and hops from jamming one premium channel frequency to the next.

One such system is known from U.S. Pat. No. 4,450,481 in which a signal frequency agile oscillator provides a hopping gain-controlled jamming signal output to four high frequency electronic switches. In this known system, each switch is associated with one subscriber drop. Under microprocessor control and depending on which subscribers are authorized to receive transmitted premium programming, the microprocessor selectively gates the jamming signal output of the single oscillator via the switches into the path of the incoming broadband television signal to each subscriber. Consequently, an unauthorized subscriber upon tuning to a premium channel will receive the premium channel on which a jamming signal at approximately the same frequency has been superimposed.

In the known system, it is indicated that sixteen channels may be jammed by a single voltage controlled frequency agile oscillator. With respect to one premium channel, this translates to a situation in which the jamming signal can only be present one sixteenth of the time or an approximately 6% jamming interval. The rate of hopping is also indicated at 100 bursts per second of jamming signal at a particular frequency or a 100 hertz hopping rate. Consequently, the effectiveness of the jamming signal is questionable.

Cable television channels and, or course, premium service may extend over a wide range of frequencies, for example, from 100 to 350 megahertz. In the known system, the single oscillator provided must be frequency agile over a wide range. Also, according to U.S. Pat. No. 4,450,481, it is further recognized that the jamming signal output of the single oscillator must be within a range of 100-500 KHz above or below the video carrier frequency. Consequently, a synthesizer having an internal reference is provided to assure the reasonable accuracy of the jamming signal output of the oscillator to a tolerable 100-500 KHz band above or below the video carrier.

It is indicated that the jamming signal is at a high relative power and is gain controlled to exceed the amplitude of the video carrier by 5 to 20 dB. Because of the high output power relative to the premium channel video carrier power and the difficulty of precisely jamming the premium channel frequency, such an interdiction system leaves considerable opportunity for improvement. Because the oscillator is frequency hopping, its spectrum tends to spread out around the picture carrier, generating a slightly different situation as far as the required adjacent channel rejection characteristics of the television signal are concerned.

Jamming oscillators usually operate near the picture carrier frequency of the television signal and preferably at an amplitude near the amplitude of the television signal. Should the amplitude of a jamming oscillator be too low with respect to the amplitude of the picture carrier, inadequate jamming of the channel may occur resulting in a recoverable picture by the subscriber. On the other hand, should the amplitude of a jamming oscillator be too high with respect to the amplitude of the picture carrier, artifacts may be generated in unsecured adjacent television channels. Such is also the case when the frequency of a jamming oscillator varies substantially from the picture carrier frequency of a channel to be jammed.

It is important that an interdiction system jamming signal frequency be placed as close as possible to the picture carrier frequency. Otherwise, adjacent channel artifacts or incomplete jamming will result. In the known system, the jamming signal is intentionally placed below the video carrier and consequently approximate to an adjacent channel producing adjacent channel artifacts.

Additionally, it is important in an interdiction system that the jamming signal be properly matched in gain with the level of an interdicted channel. Furthermore, it is important that gain of a jamming oscillator match the level of an interdicted channel not only to compensate for drifts in the components due to temperature variations and seasonal weather changes but to compensate for level variations due to its location in a television distribution plant and to compensate for tilt due to imperfect gain requirements of a distribution cable over the frequency spectrum. Otherwise, adjacent channel artifacts or incomplete jamming will result. In the known system, conventional gain sensing and control circuits are used for gain control to compensate only for the simplest of variations.

Not only in conventional interdiction systems but also in accordance with parent application U.S. Ser. No. 279,619, the jamming carrier was matched to the picture carrier. In our parent application, it was suggested to improved gain control by sampling the picture carriers at high and low ends of the frequency spectrum so as to be better prepared to regulate the jamming carrier amplitude level to match the level of the incoming picture carrier. Furthermore, it was suggested that a slope characteristic for the particular cable distribution plant could be downloaded to an interdiction unit in the vicinity of the subscriber for improved gain control. However, even with such techniques, it became clear that further improvement in gain control apparatus was possible.

In a normal CATV subscriber installation and regardless of whether jamming, negative trap, positive trap or interdiction apparatus is applied, the picture carrier signal level can be expected to vary by several decibels over time and temperature. This variance may result from variable losses in the distribution cable, errors in the automatic gain control circuits of distribution amplifiers, tired electronic components and soldered connections and other effects known to those skilled in the art of CATV system design and maintenance.

The variations in picture carrier amplitude levels may be compensated in the automatic gain control circuits typically provided in subscriber television receivers. However, due to the popularity of television, one subscriber may have several television sets, video-cassette recorders and other devices connected in parallel to the distribution plant which further render the picture level received at any one installation highly unpredictable.

Subscribers may obtain a low cost distribution amplifier for use in homes having multiple televisions to improve the level of picture carrier received at a particular television set. The amplifier is used ahead of any signal splitting so that the signal is amplified first before it is distributed through the home. However, the amplifier used is usually of low quality in order to keep cost low. A shortcoming of such amplifiers is frequently poor distortion characteristics which are exacerbated by high signal levels. Should an amplifier be installed when signal levels are low and then rise over time, for example with changing temperature, the amplifier may distort and degrade the picture.

Also, from the art of design of cable distribution amplifiers, it is known to sense the level of a picture carrier after a variable gain element and adjust the gain of the variable gain element until the picture carrier level sensed is equal to a predetermined reference level established during the design of the cable distribution plant. Consequently, while controlling the gain of a picture carrier is known from the design of cable distribution systems, no previous consideration was given to controlling the gain of a picture carrier in a jamming or interdiction system at a subscriber unit.

Typically, in conventional systems as already alluded to, the gain control for matching the jamming carrier level to the incoming picture carrier is carried out on a per subscriber basis. This is a costly procedure, and so there remains in the art a requirement to reduce costs wherever possible without jeopardizing the quality of any television signal received at a customer's premises. For example, cost reduction is appropriate for each subscriber unit or common circuitry associated with several subscriber units as, for example, is provided by FIG. 2 of U.S. application Ser. No. 166,302.

Consequently, prior to the present invention, the need remained for an improved gain control system which alleviated the effects of changing cable distribution plant characteristics in view of variations in varying home installations. Furthermore, any such gain control circuit should be provided in a cost-effective manner without jeopardizing signal quality.

SUMMARY OF THE INVENTION

It is an object of the present invention to provide an efficient, cost-effective cable television system with improved gain control.

It is a further object of the present invention to provide improved gain control which takes into consideration variations in cable distribution plant over time and temperature and in subscriber installations.

It is a further object of the present invention to provide self attenuation calibration for a variable attenuator regulating a picture carrier signal level for a proper gain match with a channel interdiction signal set at a predetermined level.

It is a further object of the present invention to provide gain control by detecting a band or group of channels of adjacent picture carriers.

It is a further object of the present invention to provide gain control using a common gain control circuit for a plurality of subscribers.

In accordance with achieving the objects of the present invention, it is a principle thereof to regulator incoming picture carrier levels rather than to regulate the output level of a jamming oscillator and to maintain the jamming signal output at a predetermined level in relation to the picture carrier level. The predetermined level of the picture carrier is selected so as to be equivalent to the result of adding an attenuation level inherent in a typical subscriber drop line to the level at the subscriber port, i.e. in a narrow range from 0 dBmv to +3 dBmv. (In the United States, a minimum 0 dBmv level is required at the subscriber premises under Federal Communications Commission regulations.) Then, as first suggested in West, et al. U.S. Pat. No. 4,912,760, the jamming signal power is predetermined within a range of −2.5 and +6.5 dB of the regulated video picture carrier level. In this manner, effects from variation in the cable distribution plant over time and temperature and from variations in subscriber installations is minimized.

Also, gain control in accordance with the present invention is provided in common circuitry associated with a plurality of subscriber units in advance of any splitting or distribution of an incoming signal to the plurality of subscriber units. In this way, costs of providing gain control are cut to a fraction of the costs of providing gain control to each subscriber.

When any subscriber unit is removed from service, the open connection is terminated in an impedance equivalent to the impedance of the transmission line in the form of a conventional T or pi network. In this manner, the common and colocated automatic gain control device is impervious to the number of subscriber units connected to the common circuitry.

In accordance with a still further embodiment of the present invention, automatic gain control using a programmed microprocessor is provided for controlling the attenuation of a variable attenuator or variable gain device of the automatic gain control circuit. The predetermined reference level for comparison with the incoming picture carrier may be downloaded to the microprocessor over a separate data channel from the head end at the same time as the microprocessor is commanded to set or reset the reference level. Also, at the same time as the reference level for operation of the variable gain device is set or reset by the programmed microprocessor, the microprocessor calculates an appropriate jamming level and sets or resets the power output levels of jamming oscillators of subscriber units.

In yet another embodiment, a detector of the automatic gain control circuit detects the broadband signal output of the variable gain device at both a low and high frequency using a low bandpass and a high bandpass filter. The attenuation of the output of the variable gain device is controlled as a function of the output of the low bandpass filter. A slope network coupled to the output of the variable gain device is controlled in accordance with the output of the high bandpass filter.

Furthermore, in accordance with the present invention, gain control is provided by sensing a band comprising a plurality of adjacent picture carriers so that no adverse impact results from the absence of any one of the adjacent carriers. So long as at least one picture carrier is transmitted, adequate gain control results. Also, the cable system operator is relieved of any requirement for assuring that a pilot picture carrier is transmitted.

These advantages and features of the present method and apparatus for providing an improved gain control device for a cable television system for selectively jamming a plurality of channels on a broadband signal under control from the headend will now be explained in the following detailed description of the invention with reference to the drawings.

DETAILED DESCRIPTION OF THE INVENTION

Now the gain control system and method of the present invention will be discussed in the context of the off-premises cable television channel interdiction apparatus first disclosed in U.S. Pat. No. 4,912,760 filed Mar. 10, 1988, the disclosure of which is herein incorporated by reference. On the other hand, the present invention is in principle not limited to gain control circuitry for an interdiction system but is also applicable to gain control circuits provided in any so-called off premises cable television system and in any other system in which the amplitude of a signal to be jammed must closely match an amplitude level of a jamming signal at a frequency close to that of the signal to be jammed and at an off-premises location proximate to a subscriber premises.

Figure 1:
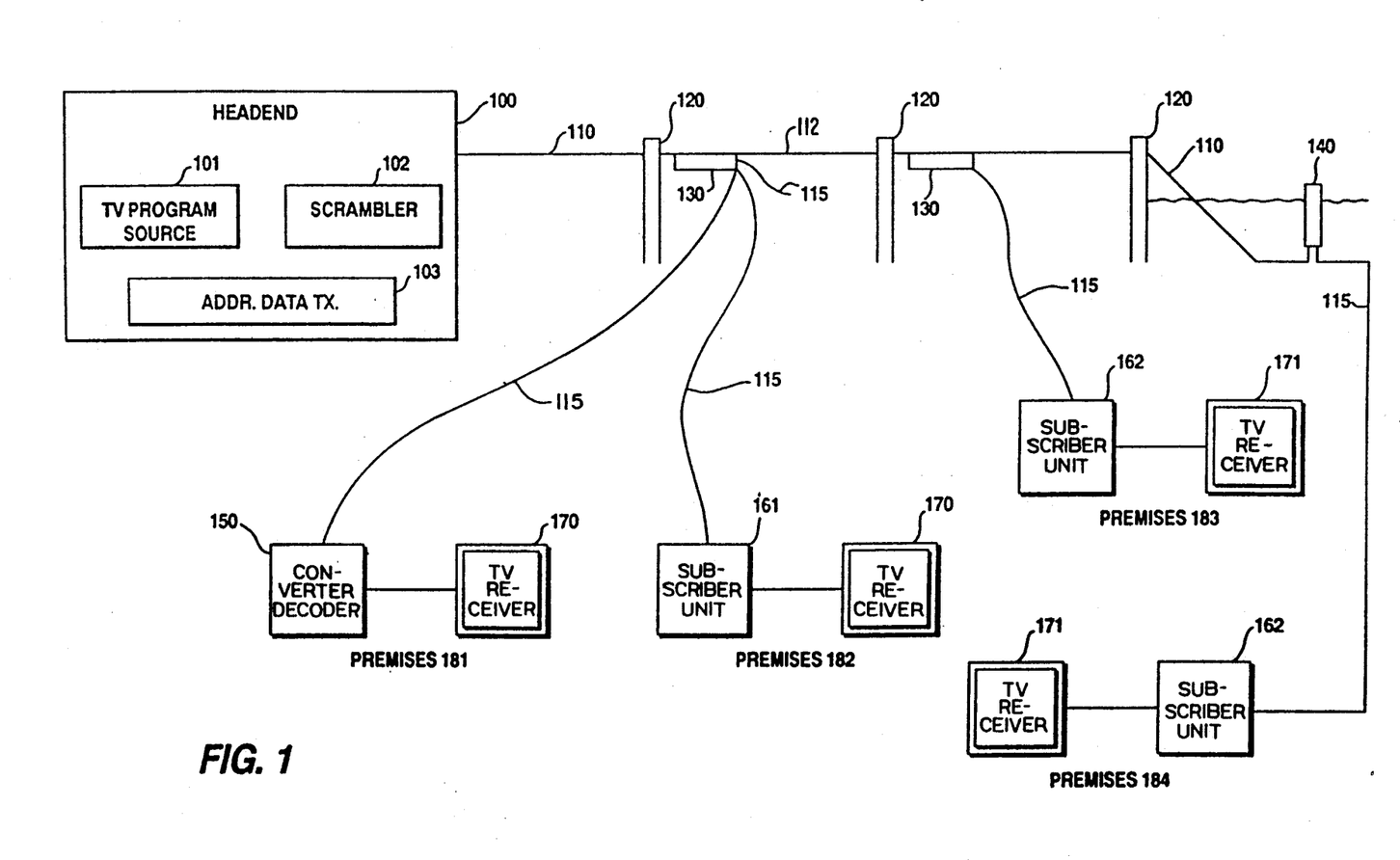
FIG. 1 is an overall system block diagram showing the inherent compatibility of the present interdiction apparatus with existent cable television systems comprising premium channel scramblers, addressable data transmitters, and subscriber converter/decoders.

Referring more particularly to FIG. 1, there is shown a general block diagram of a cable television system employing the principles of the present invention. By cable television system is intended all systems involving the transmission of television signals over a transmission medium (fiber optic cable or coaxial cable) toward remote locations. For example, a cable television system may comprise a community antenna television distribution system, a satellite signal distribution system, a broadcast television system, a private cable distribution network, either industrial or educational, or other forms of such systems. Each remote location of a television receiver may comprise the location of a particular subscriber to a subscription television service, plural subscribers, single subscribers having plural television receivers or private locations in a private cable distribution network. Consequently, the term subscriber, when used in this application and the claims, refers to either a private subscriber or a commercial user of the cable television system. Headend 100 as used in the present application and claims is defined as the connecting point to a serving cable or trunk 110 for distributing television channels over feeder line 112 to drop 115 and finally to subscriber locations. For reference purposes, an Electronic Industries Association (E.I.A.) standard cable television frequency allocation scheme is employed and referred to herein; however, by means of the following disclosure of the present invention, one may apply the principles to other known standards or non-standard frequency allocations. Furthermore, a National Television Subcommittee (N.T.S.C.) standard composite television signal at baseband is generally considered in the following description; however, the principles of the present invention apply equally to other standard and non-standard baseband television signal formats.

Headend 100 comprises a source of television programming 101. Television program source 101 may be a satellite television receiver output, a program produced by a television studio, program material received over a microwave or broadcast television link, a cable television link output, or any other source of television programming consistent with the present invention. The program source material need not be limited to conventional television but may comprise teletext, videotext, program audio, utility data, or other forms of communication to be delivered to a remote location over the serving cable or trunk line 110 and subsequently over feeder line 112 and drop line 115.

Conventionally, trunk line 110, feeder line 112, and drop line 115 are constructed of coaxial cable. For higher performance, any one of these lines could be a fiber optic cable. Preferably, due to the cost of the installation and the need for a high quality initial transmission from headend 100, trunk line 110 is typically the only line constructed of fiber optic cable.

Program material provided by source 101 may be premium or otherwise restricted or desirably secured from receipt at unauthorized receiver locations. To this end, each channel or program to be secured is generally scrambled by scrambler 102 provided at headend 100. By the use of the term premium channel or premium programming in the present application and claims is intended a channel or program which is desired to be secured from unauthorized receipt either because of its premium or restricted status.

Normally, all premium programming in known cable television systems is scrambled. However, in accordance with an interdiction system, premium programming is transmitted in the clear, and interdiction is applied at off-premises interdiction apparatus 130 to jam reception of unauthorized premium programming.

Consequently, during a transition period in which headend 100 provided scrambled television programming as well as premium programming in the clear, a scrambler 102 will be provided so long as converter/decoders 150 are provided to subscribers for unscrambling scrambled program transmission. In certain instances, converter/decoders 150 may be entirely replaced by off-premises interdiction apparatus 130.

Also, at the headend, there is normally an addressable data transmitter 103 for transmitting global commands and data to all channels or addressed communications for reception by a unique subscriber. Such data transmission may be conducted over a separate data carrier from the cable television spectrum, for example, at 108.2 megahertz. It may also be transmitted over an unused default channel from the television spectrum. Global commands generally take the form of operation code and data while addressed communications further comprise the unique address of a particular subscriber.

In another alternative embodiment, such communications may take the form of in band signals sent with a television channel superimposed upon an audio carrier during, for example, the vertical interval of the video signal. Such data communications further complicate data reception at intervention apparatus 130 in accordance with the present invention and are desirably eliminated. However, in band signaling is sometimes required for the operation of certain converter/decoders 150 known in the art.

Consequently, headend 100, cable television serving cable or trunk line 110, and converter/decoders 150 and television receivers 170 at a typical subscriber premises 181 comprise a typical known cable television system. Channel program or authorization data is transmitted via an addressable data transmitter 103 over a trunk line 110 to feeder line 112. At a pole 120 or from a pedestal 140 at underground cable locations, the serving signal is dropped via drop 115 to a subscriber location. Drop 115 is connected to a conventional converter/decoder 150 which serves several functions. Responsive to an addressed communication from headend transmitter 103, channel or program authorization data is updated in an authorization memory if the address associated with the addressed communication matches a unique address of the subscriber decoder 150. For example, the subscriber address may comprise a plurality of bits over and above the actual number of subscribers in a system, additional bits insuring the security of the address. The premium channel or program is then stored in the authorization memory of the converter/decoder 150. Television programming is normally converted to an otherwise unused channel such as channel 3 or 4 of the television spectrum by a converter portion of converter/decoder 150. Its premium status is checked against the data stored in authorization memory. If the programming is authorized, the decoder portion of the converter/decoder is enabled to decode authorized scrambled premium programming.

The provided television receiver may be a conventional television receiver 170 or may be a so-called cable ready television receiver 171. Because of the advent of cable ready television receivers 171, there is no longer a requirement at a subscriber premises 181 for the converter portion of the converter/decoder 150 as a converter is built into such television receivers.

In accordance with a cable television system provided with off-premises interdiction apparatus 130, a housing is mounted on a strand supporting feeder cable 112, to a pole 120, or provided via a pedestal 140. Inside the housing is common control circuitry for tapping into the broadband television and data transmission spectrum. Referring to the first pole 120 from the left of FIG. 1, there is shown a strand-mounted apparatus serving two drop 115 to subscribers. Altogether, four subscribers and up to four drops 115 may be served by off-premises interdiction apparatus 130. Besides the common control circuitry, up to four (or more) plug-in subscriber modules may be provided for one housing. Also, if desired, additional services may be provided via other plug-in units of the housing such as impulse pay-per-view, subscriber polling involving two-way data communication, meter reading, energy management or other services. A detailed discussion of providing a cable television reverse path for such services is provided in concurrently, filed application Ser. No. 446,695 entitled "CATV Reverse Path Manifold System."

Desirably, all equipment 161 may be removed from the subscriber premises 182. However, for the provision of additional services, some on-premises equipment may be unavoidable. For purposes of this description, premises 182 will be assumed to include at least one non-cable ready conventional television receiver 170. Consequently, subscriber equipment 161 must at least comprise a tunable converter for converting a received cable television channel to an unused channel such as channel 3 or 4 for reception on conventional television receiver 170.

Power for interdiction apparatus 130 may be provided over the cable from the headend 100 or be provided via the subscriber drop 115 or by a combination of such means. Foreseeably, power may be even provided by rechargeable means such as solar cells or other external or replaceable internal sources such as batteries. Consequently, subscriber equipment 161 may also comprise a source of power for interdiction apparatus 130.

Interdiction apparatus 130 may be secured in a tamper-resistant housing or otherwise secured such as in a locked equipment closet of an apartment complex. If located in a place exposed to the elements, the housing should be water-tight. Also, the housing should be designed to preclude radio frequency leakage.

At premises 183, the subscriber is presumed to have a cable ready television receiver 171. Consequently, subscriber unit 162 may be entirely eliminated or comprises simply a power feed to interdiction apparatus 130.

Premises 184 pictorially represents a subscriber location served by an underground cable 110 via a plurality of pedestals 140, in which cable distribution amplification and branching equipment and drops 115 are normally provided. Pedestal 140 may comprise an off-premises housing for interdiction apparatus 130. Subscriber equipment 162 may comprise a converter, an additional service device and a power unit as described in reference to subscriber equipment 161 or nothing at all as described in reference to subscriber equipment 162.

Interdiction apparatus 130 is uniquely addressable by headend 100 just as is converter/decoder 150. If two bits of a plural bit unique subscriber address are associated with uniquely identifying one plug-in slot for one of four subscriber modules, common control circuitry may be uniquely addressed with remaining address data not used to secure the data communication. Just as premium programming is transmitted in the clear and since no data communication is necessarily required with a subscriber premises, a subscriber address need not be transmitted in a secure form in accordance with the principles of the present invention. Nevertheless, address security may be desirable so long as converter/decoders 150 or other unique address requisite equipment is provided at a premises.

Interdiction apparatus 130 comprises addressable common control circuitry and up to four or more plug-in subscriber modules. Upon receipt of subscriber specific premium program or channel authorization data, the data are stored at interdiction apparatus 130. Interdiction apparatus 130 further may comprise automatic gain control circuitry of the common control circuitry. Channel interdiction circuitry associated with each subscriber module jams unauthorized premium programming dropped via a particular drop 115 to a particular subscriber. Consequently, interdiction apparatus 130 is reasonably compatible with addressable authorization data transmission known in the art. No scrambling of premium channels (and no resulting artifacts) is necessary or desirable. Furthermore, no additional forms of service security are necessary such as channel encryption, in-band channel or tier verification or other security measures. The would-be service pirate must attempt to remove a particular pseudo-randomly timed jamming signal placed at a varying frequency or seek to tamper with the off-premises apparatus 130 or derive a signal from shielded and bonded cable 110 which should likewise be maintained secure from radio frequency leakage.

Figure 2:
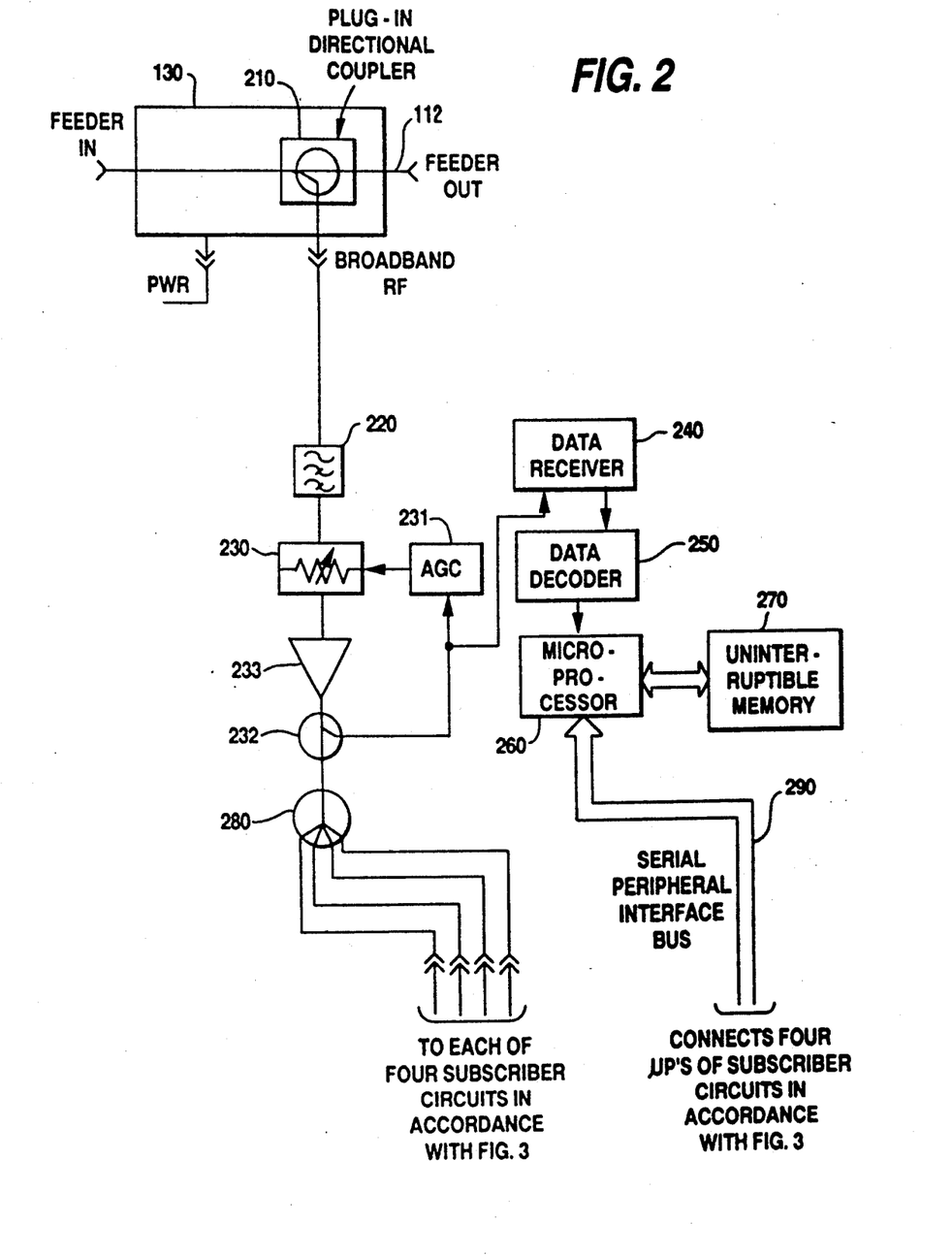
FIG. 2 is a block schematic diagram of an addressable common control circuit for a plurality of provided subscriber modules comprising a broadband signal tap, a microprocessor, a data receiver and decoder and an automatic gain control circuit according to the present invention.
Figure 3:
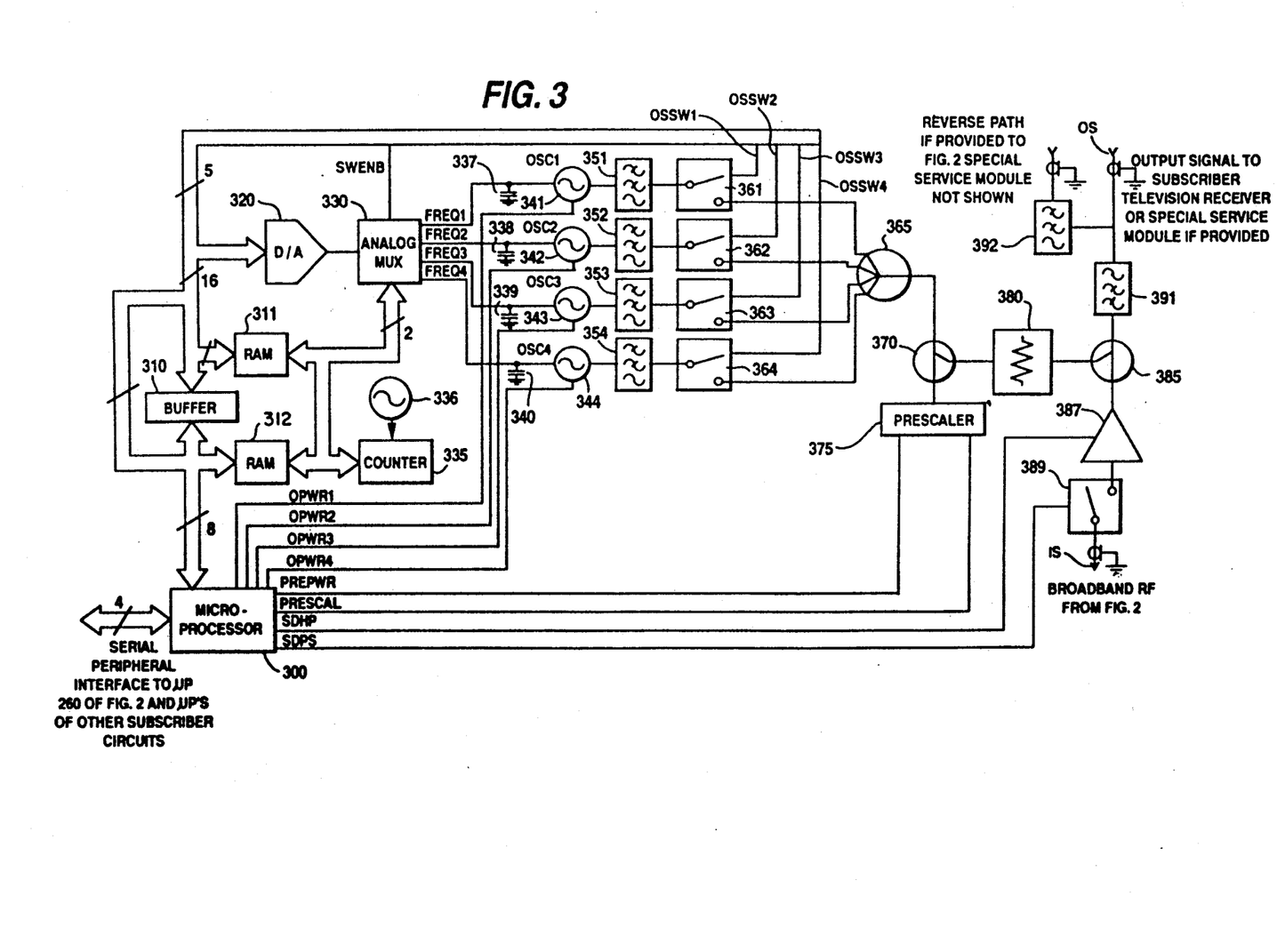
FIG. 3 is a block schematic diagram of one subscriber module comprising a microprocessor for selectively actuating and controlling the output frequency provided by each of four voltage controlled oscillators such that during a normal mode of operation sixteen premium channels may be jammed at a minimum twenty percent jamming interval and, during a calibration mode, a feedback path is provided to the microprocessor through a programmable prescaler to precisely establish jamming signal frequencies.

The common control circuitry of interdiction apparatus 130 will now be descirbed by means of the block diagram FIG. 2 for serving at least one and up to four or more subscriber modules in accordance with the block diagram FIG. 3. Referring particularly to FIG. 2, a feeder cable 112 is shown entering interdiction apparatus 130 at FEEDER IN and leaving at FEEDER OUT. Power PWR may be provided via the feeder cable by means of a subscriber drop or locally by internal or external means. Depending on the source of power PWR, input power may be of alternating or direct current.

A directional coupler 210 which may be in the form of a plug-in module taps into the broadband serving cable 110. A broadband of radio frequency signals is thus output to highpass filter 220. Highpass filter 220 passes a band of frequencies comprising at least the data carrier frequency or frequencies (in a bi-directional application) and the cable television channel spectrum. Referring briefly to FIG. 4(b), the cable television spectrum may comprise a frequency band from about 54 MHz to 350 MHz.

A common-automatic gain control circuit as disclosed in FIG. 2 comprises variable attenuator 230, RF amplifier 233, directional coupler 232, and AGC control circuit 231. This automatic gain control circuit appropriately regulates the broadband RF signal power to fall within established limits. The off-premises common circuitry of FIG. 2 is colocated or closely located to the subscriber units which will be further described in connection with FIG. 3 and may be contained in the same housing.

AGC control circuit 231 provides a common gain control for regulating gain of a broad band of picture carrier signals received by all subscriber units. According to the principles of the present invention, the incoming broadband picture carrier is regulated at this common point to fall within a range which is −2.5 dB to +6.5 dB from the jamming carrier but, more importantly, is fixed at a predetermined level so as to deliver a constant power level to the subscribers served. The predetermined reference level by which the incoming picture carrier is adjusted is set to be one nominal drop attenuation from the level at the entrance to the subscriber's premises.

Referring again briefly to FIG. 1 and particularly to premises 181-184, a minimum signal level of 0 dBmv at the subscriber premises is required under United States Federal Communications Commission regulations. Considering a nominal drop line 115, then, the predetermined reference level of the picture carrier may be +3 dBmv and the predetermined power jamming level should be set at the subscriber units of FIG. 3 ideally at about +0.5 to +9.5 dBmv or nominally at +5.5 dBmv. Of course, if the drops are exceptionally short, for example, as are involved in residential subdivisions, apartment complexes, townhouse developments and the like, the predetermined reference and jamming carrier levels may be adjusted accordingly. On the other hand, in rural areas it may be recognized that off-premises gain control circuitry may be required on a per subscriber basis because of the distance (and resulting distribution cable attenuation) between subscribers. Recognizing this eventuality, it is a principle of the present invention to provide a terminating impedance at each output terminal of a radio frequency signal splitter 280. This impedance should be equal to the impedance of the cable or optical fiber or other media used. For example, a T or pi network of resistors having an impedance of 75 ohms would be appropriate for terminating a 75 ohm coaxial cable.

Also connected to directional coupler 232 is a data receiver 240 for receiving data from the addressable data transmitter 103 located at headend 100. Data receiver 240 receives data transmitted, for example, over a data carrier of 108.2 megahertz and provides unprocessed data to data decoder 250. In accordance with an established protocol, such data may be in the form of an operation code, a subscriber unique address and associated data. Data decoder 250 processes the data and provides the separately transmitted data to microprocessor 260 for further interpretation in accordance with a built-in algorithm. Microprocessor 260 is most efficiently chosen to alleviate as many responsibilities from any microprocessor provided for an individual subscriber module and so is most conveniently an eight bit microprocessor having eight kilobytes of internal code such as a Motorola 68HC05C8.

Received data may be stored in uninterruptable memory 270 by microprocessor 260. Data may be temporarily stored in memory 270 or more permanently stored and subsequently downloaded when needed to a subscriber module via a serial peripheral interface bus connecting microprocessor 260 with separate microprocessors associated with each provided subscriber module.

Variable gain unit 230 regulates the received broadband of picture carries to the above-described reference level while the microprocessor 260 controls the jamming carrier level outputs of associated subscriber units within the prescribed range. A more detailed description of AGC control circuit 231 followed in connection with the discussion of FIGS. 5(a), 5(b) and 6.

Microprocessor 260 consequently interprets both global communications addressed to common control circuitry such as a command to set automatic gain reference levels or communications addressed to unique subscriber modules or both. If appropriate, microprocessor 260 ignores global or addressed communications to other interdiction apparatus 130 or to converter/decoders 150 (FIG. 1). Examples of global communications peculiar to interdiction apparatus 130 are premium channel frequency data and jamming factor data for each premium channel or channel over which premium programming at a particular point in time is provided via headend 100. Examples of addressed communications include communications comprising premium channel or programming authorization information or communications instructing common control circuitry to deny or provide service to a particular subscriber.

If two way services over the serving cable are anticipated, a data transmitter (not shown) may be provided in the common control circuitry of FIG. 2 or a separate telephone link from the subscriber location to the headend may be provided. Serial peripheral interface bus 290 may be a two way communications link by way of which link microprocessors 300 (FIG. 3) associated with subscriber modules may, at least, provide status reports to microprocessor 260 upon inquiry.

Figure 4A:
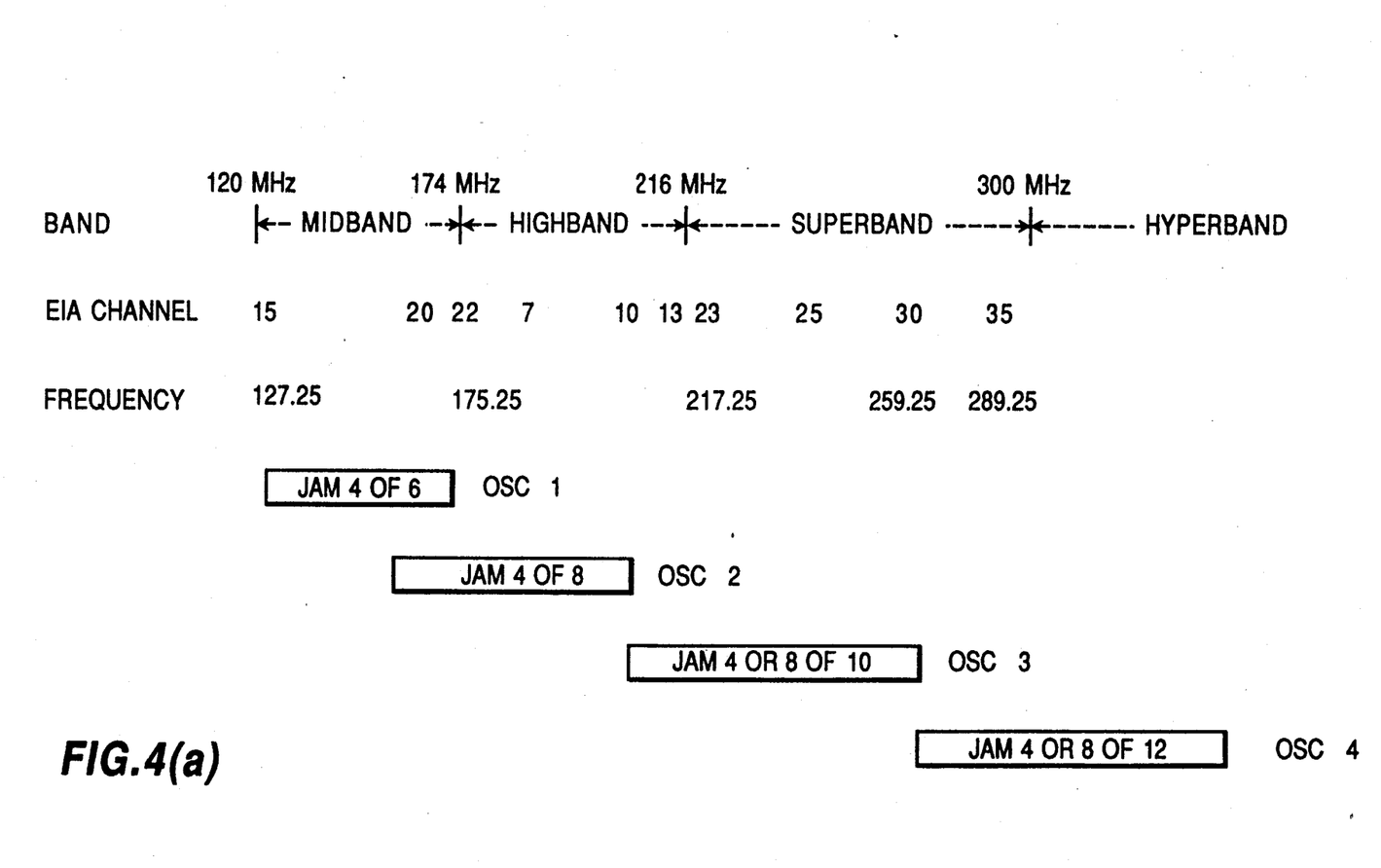
FIGS. 4(a) and 4(b) represent frequency plans for allocating the broadband cable television spectrum among four or five separate bands, each of which bands comprising a plurality of channels greater than or equal to four but, of which plurality, only four channels may be jammed at a 20% jamming interval.
Figure 4B:
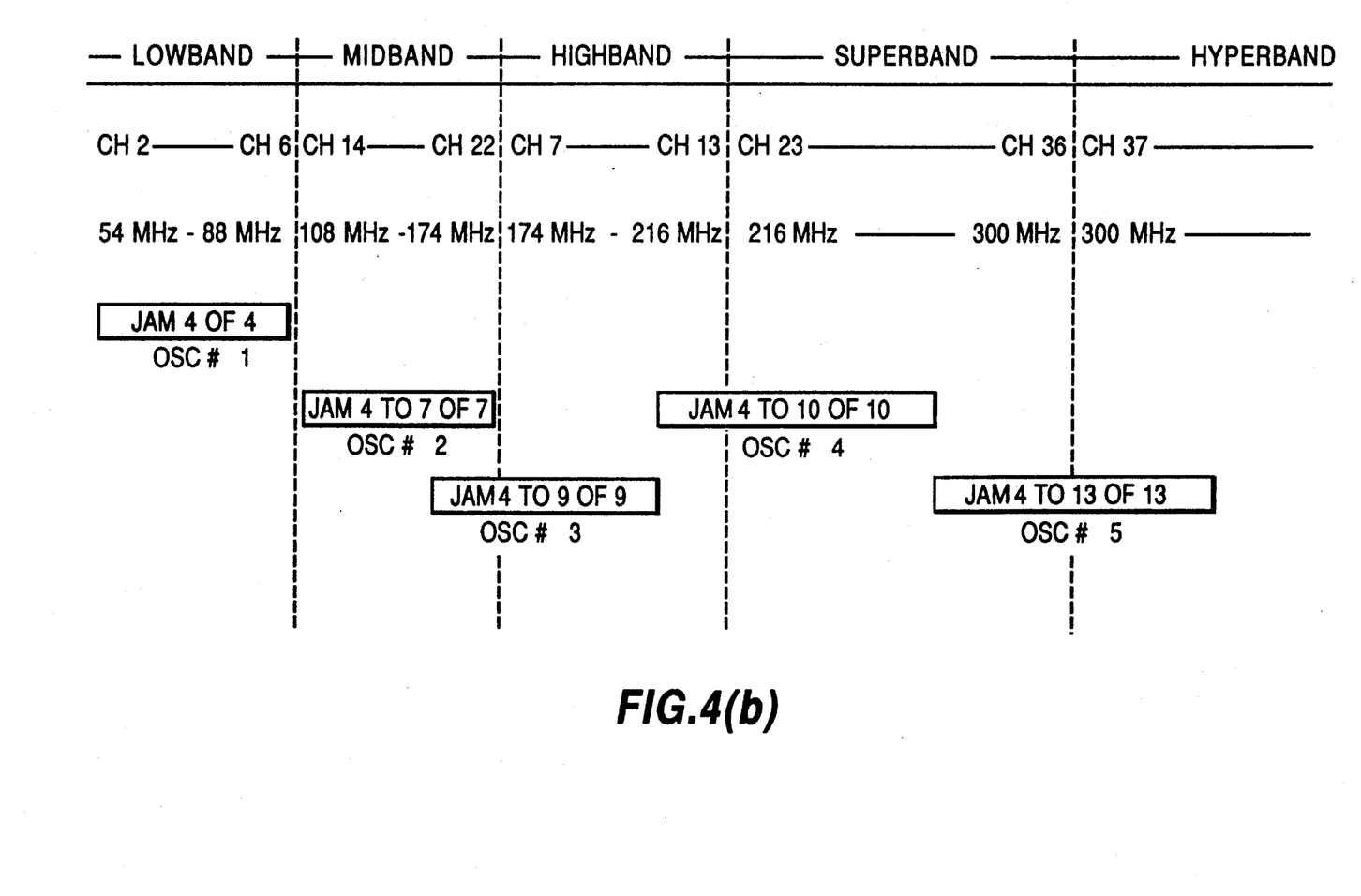

Radio frequency splitter 280 provides broadband radio frequency signals comprising at least the cable television service spectrum of FIGS. 4(a) and 4(b) separately to each subscriber module that is provided.

If a reverse path is required for special additional services, a signal combiner (not shown) of a plug-in special service module may be provided for receiving communications from each of the provided subscriber modules in an opposite manner to RF splitter 280. Certain data may be transmitted back toward the headend via the special service plug-in module (also, not shown) associated with the additional special service.

Referring more particularly to FIG. 3, there is shown an overall block schematic diagram of a subscriber module in accordance with the present invention. A microprocessor 300 is associated with a particular subscriber module and communicates with microprocessor 260 of FIG. 2 over a serial peripheral interface bus. Microprocessor 300 may comprise an eight bit microprocessor equipped with only two kilobytes of code, this microprocessor being relieved of overall control responsibilities by microprocessor 300. Consequently, microprocessor 300 may conveniently comprise a Motorola 68HC05C3 microprocessor or similar unit.

A reverse path may be provided via a lowpass filter 392 to a special service module (not shown) of common control circuitry as described in FIG. 2 from a corresponding console on the subscriber premises. Such a reverse path is completed to the subscriber via terminal OS. Also, power may be transmitted up the subscriber drop to the module of FIG. 3 and withdrawn at terminal OS.

The broadband radio frequency television spectrum signal from FIG. 2 is provided to terminal IS. Referring to the path connecting terminal IS to terminal OS, there are connected in series a service denying switch 389, an amplifier 387, a jamming signal combiner 384, and a high pass filter 391. Service denying switch 389 is under control of microprocessor 300. In the event of an addressed communication from headend 100 indicating, for example, that a subscriber is to be denied service for non-payment of a bill, service denying switch 389 may be opened. In addition, a high frequency amplifier 387 may be powered down under control of microprocessor 387 whenever service is to be denied. Otherwise, amplifier 387 may be set at discrete gain levels, under microprocessor control, to provide supplemental gain to the broadband television signal if a subscriber has a plurality of television receivers over and above a nominal amount. A further discussion of a subscriber disconnect switch may be found in concurrently filed U.S. application Ser. No. 446,604, entitled "CATV Subscriber Disconnect Switch."

Jamming signals are introduced at directional combiner 385 under microprocessor control. Because of the directional characteristic of amplifier 387, jamming signals cannot inadvertently reach the common control circuitry of FIG. 2 or the serving cable 110. Jamming signals are introduced at a level approximately within a range of −2.5 db to +6.5 db or +2 dB nominal of the video picture carrier power level of the unauthorized premium channel frequency to be jammed. They are most conveniently introduced for video carrier jamming approximately within a range of frequencies extending from the video carrier to +250 kilohertz above the video carrier toward the audio carrier of the channel to be jammed. The frequency is selectable by the headend 100 and so may be chosen to jam the audio carier at a frequency closer to that carrier if desired. Also, the power level of the jamming signal may be selected from the headend as well. Both the power level and frequency of the jamming signal may be intentionally varied via global data transmissions if, for example, audio carrier jamming is desired. Such interdiction on a per channel basis between the video and audio carriers minimizes adjacent channel artifacts. A further discussion of amplitude and frequency of a jamming carrier is found in U.S. application Ser. No. 446,602 filed concurrently herewith and entitled "Optimum Amplitude and Frequency of Jamming Carrier in Interdiction Program Denial System".

Highpass filter 391 prevents any return path signals from reaching combiner 385 and passes the broadband spectrum including any jamming signals toward terminal OS. Reverse path signals, for example in this embodiment, if present, may be radio frequency signals below 54 megahertz. The broadband television spectrum is presumed to be in the 54-350 megahertz range consistent with FIG. 4. However, interdiction of premium channel viewing may be allocated anywhere desired within a broader or discontinuous cable television spectrum to be jammed. Consequently, filters 391 and 392 are designed in accordance with this or similarly selected design criteria to block or pass broadband television or reverse path signals as required.

Microprocessor 300, responsive to common microprocessor 260, controls the frequency and power level outputs of four (or five if necessary) voltage controlled oscillators 341-344, each of which oscillators jams premium channel frequencies within an allocated continuous range of frequencies. The frequency of the oscillators is set over leads FREQ1-4 in a manner described in U.S. application Ser. No. 166,302. A power level and on/off operation of the oscillators 341-344 are controlled over leads POWR1-4.

Since premium programming may be transmitted anywhere in the cable television spectrum, the sum of all such allocated portions comprises the entire television spectrum to be jammed (even where non-premium channels are normally transmitted). The television spectrum to be jammed may comprise discontinuous portions or intentionally overlapping portions.

Referring briefly to FIG. 4(a), the spectrum allocation to the plurality of four voltage controlled oscillators in one embodiment will be discussed in view of certain principles. Five voltage controlled oscillators can alternatively be used in another embodiment as shown in FIG. 4(b). In FIG. 4(b), a fifth low band oscillator may be provided if premium service is transmitted over normally non-premium channels such as channels 2-13. Firstly, with reference to FIG. 4(a), it is desirable to eliminate jamming signal harmonic interference to authorized channels within the allocated band. For example, a harmonic of a relatively low frequency signal, for example 100 MHz can interfere with a channel at a harmonic of this frequency in the upper part of the cable television spectrum. In other words, the allocated band should be limited for an oscillator to fall within one third of an octave, and, consequently all frequency harmonics may be blocked by filters 351, 352, 353 and 354 associated with each oscillator. Oscillator 341 denoted OSC 1, for example, is active in a band extending from 126 to 158 megahertz while filter 351 will block harmonics above the included channels 15-20 of the midband.

Cable headend service providers tend to select premium channel allocations in the midband range covering channels 15-22. Consequently, the band of oscillator 342, for example, may be selected to overlap the band allocated to oscillator 341.

A further detailed discussion of frequency control may be found in U.S. patent application Ser. Nos. 166,302 and 279,619.

Figure 5A:
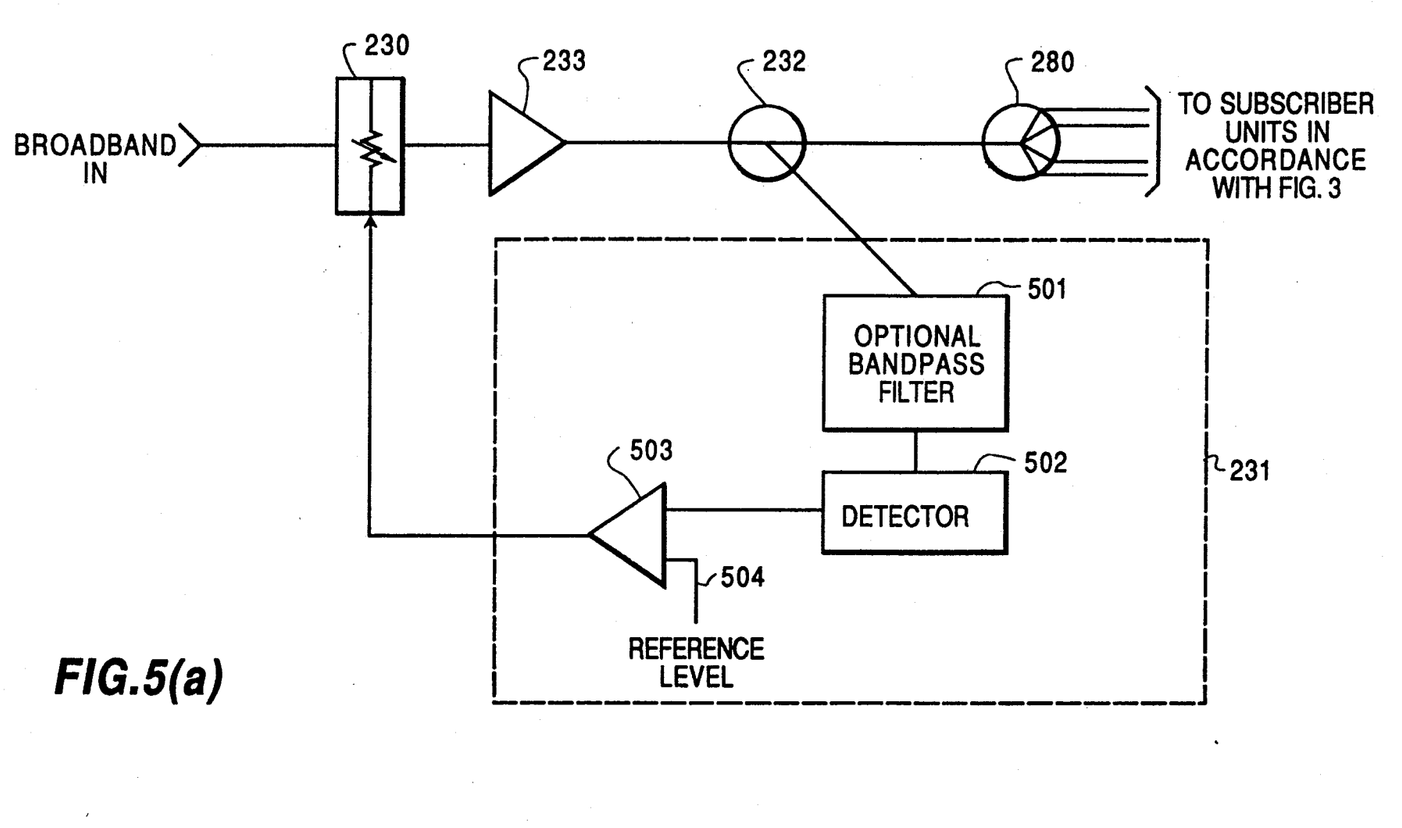
FIG. 5(a) is a detailed block schematic diagram of one embodiment of an automatic gain control circuit in accordance with the present invention.

Now, referring to FIG. 5(a), there is shown a detailed schematic block diagram of automatic gain control circuit 231 of FIG. 2. A broadband picture carrier signal comprising the band of picture carriers of FIG. 4(a) or 4(b) or a similarly related band is received at variable attenuation unit 230. A fixed predetermined gain is applied at radio frequency amplifier 233. The resultant broadband signal is transmitted to colocated subscriber units in accordance with FIG. 3 via directional coupler 232 and radio frequency signal splitter 280.

Of course, one of ordinary skill in the art will recognize that the series combination of variable attenuation unit 230 and fixed gain RF amplifier 233 may be replaced with a variable gain amplifier as appropriate.

According to the present invention and referring to the combination of unit 230 and amplifier 233 as a variable gain device, the gain (or loss) of the device is controlled by a control signal output of error difference amplifier 503. A sample portion of the incoming broadband picture carrier signal is directed via directional coupler 232 and passed by filter 501 to detector 502. Detector 502 detects the power level of the output of filter 501 and provides a signal indicative of that level to error amplifier. Broadpass filter 501 may be eliminated if the entire passband is to be sampled.

Amplifier 503 compares the measured level of the broadband signal to a reference level set during design according to the above-discussed principles of establishing a predetermined picture carrier level at the input to the customer premises. If the two levels are not equal, an error control correction signal is output from error amplifier 503 to readjust the gain control device. Readjustment of the picture carrier input will be required over time and temperature ranges and will be automatically performed by the automatic gain control circuit of the present invention. Furthermore, by establishing a predetermined picture carrier level at the input to the subscriber premises, variations in subscriber installations are accounted for.

To reiterate the principles of establishing reference level 504,

Ref. Level = Premises Level + Drop Loss where Premises Level is the desired level at the entrance to the subscriber and Drop Loss is the nominal drop loss from the up to four or more colocated off-premises subscriber units to the subscriber premises.

Also, the jamming carrier level output of each subscriber unit of FIG. 3 is predetermined to be within a range of −2.5 to +6.5 dB of the predetermined reference level 504.

Referring again to FIG. 2 and in accordance with the present invention, data receiver 240 may receive a command signal from the head end indicating the reference level to be established at reference level 504. Microprocessor 260 then transmits a command or set or reset reference level 504 at the desired level. Via bus 290 to microprocessors 300 of each off-premises subscriber unit (FIG. 3), microprocessor first calculates a nominal jamming signal level, i.e. at +2.5 dB from the reference level and transmits that information over the bus to the microprocessors 300 which then control the jamming signal outputs of the oscillators OSC1-4 within the above-described predetermined range.

Now the design of an appropriate bandpass filter 501 will be discussed in greater detail. It is known from the art of design of cable distribution plant to design a filter such as filter 501 in a gain control circuit of a cable distribution amplifier to select a single channel to use as a gain control channel to be sampled. In such a cable distribution amplifier application, one channel is designated a pilot channel and the filter is designed to pass this channel and stop all others. The CATV system operator, however, is constrained and must exercise diligence to ensure that a signal is always present on the pilot channel. Due to differences in the way different CATV systems are operated, the same channel cannot be used universally. Typically, the bandpass filter then is designed as an exchangeable plug-in module which is installed with the distribution amplifier. Also, it is common to provide for a range of channels which might be used, and a different bandpass filter is made available by a manufacturer for each possible pilot channel.

To overcome this difficulty, two such pilot carrier channels may be designated, so that the absence of one is not missed. Separate bandpass filters are provided for each and separate detectors providing a common error control signal to a variable gain device of the distribution amplifier.

Furthermore, in a variation of this embodiment, one pilot channel may be selected near the low end of the CATV spectrum and one near the high end. In this cable television distribution amplifier, the low end signal controls the AGC circuit and the high end signal controls a slope control circuit connected in series in the broadband signal path and coupled to the output of the high end signal detector. This embodiment, however, since it uses only one pilot channel for automatic gain control still places the requirement on the system operator to be sure that the low end pilot channel is present.

Figure 5B:
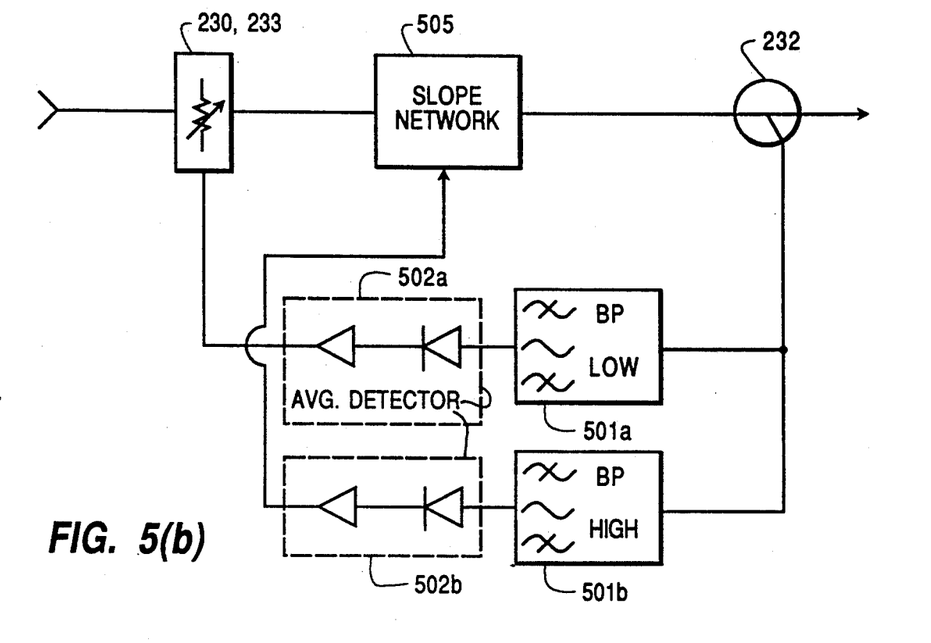
FIG. 5(b) is a detailed block schematic diagram of a second embodiment of the automatic gain control circuit of FIG. 5(a) in which slope correction is provided.

A second embodiment of a gain control circuit for the jamming or interdiction system of the present invention is shown in FIG. 5(b). According to FIG. 5(b), detector 502a may detect a low band of frequencies, not just a single pilot channel, and pass its control signal output to variable attenuator 230 while detector 502b detects a high band of frequencies output from high bandpass filter 501b and applies its output signal to a variable slope network 505 which inserts an appropriate amount of slope correction to correct for the measured amount of slope across the broadband spectrum. As indicated in FIG. 5(b), detectors 502 may simply comprise RF detector diode and amplifier circuits known in the art.

Specifying only a single channel for bandpass filter 501 (FIG. 5(a)) or 501a or b (FIG. 5(b)) would present the same and related difficulties as using a single pilot channel in the design of distribution amplifiers. It was desirable to reduce costs and improve manufacturing efficiency which problem was solved by investigating the feasibility of providing a contiguous band of puncture carriers and an appropriately designed filter for passing such a band. In accordance with the present invention, it was not necessary to manufacture and provide a plurality of filters, one for each possible pilot carrier. Furthermore, in most cable distribution plants, the pilot channels chosen for regulating the automatic gain control circuits of distribution amplifiers are not necessarily (although it might be appropriate in some circumstances) the same channels as those protected in an interdiction or jamming system as per FIGS. 4(a) and 4(b).

Consequently, according to the principles of the present invention, bandpass filter 501, 501a or 501b are each designed as fixed (not interchangeable), simple, low cost filters encompassing a plurality of channels. Furthermore under these conditions, more than adequate gain control characteristics result because, even though a particular channel within the contiguous band may or may not be present, it has been statistically determined that adding a number N of channels together greater than two still permits acceptable AGC performance. The cable operator then is free to add or remove a subset of the channels of the band and yet have a minimal effect on the automatic gain control characteristics and performance.

Figure 6:
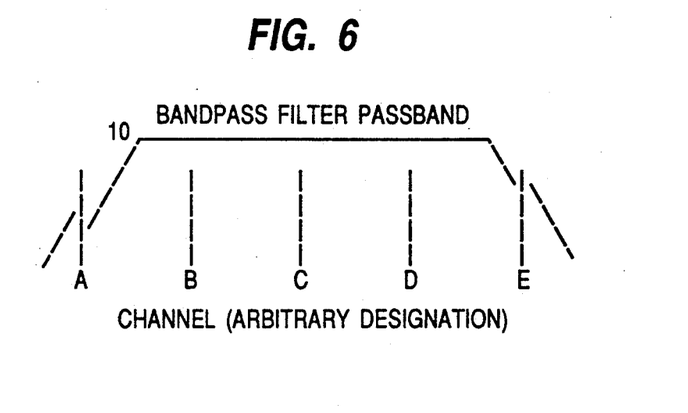
FIG. 6 is a suggested frequency bandpass characteristic for the bandpass filters 501 of FIGS. 5(a) or 5(b).

An exemplary band of contiguous picture carrier frequencies is shown in FIG. 6 for designing filters 501,501a or 501b. Referring now to FIG. 6, the figure shown N equal to 5 total channels for illustration purposes, but the technique is understood to apply to a plurality of channels, greater than two, which could include any reasonable number of channels. Channel designations A-E shown in FIG. 6 are for illustrative purposes only and should not be construed as being the channels so designated traditionally in the CATV industry. The filter characteristic of FIG. 6 is shown to encompass three channels totally, channels B, C, and D, and has partial response at two other channels, A and E. In this example, the three totally encompassed channels B, C, and D contribute equally to the ultimate signal level measured at the detector 502, 502a or 502b. Channels A and E provide a contribution to the signal level detected, but to a lesser extent than middle channels B, C, or D.

With a filter having a passband as generally shown in FIG. 6, more than acceptable performance results so long as at least one of the totally encompassed channels B, C, or D has signal, and there need be no concern if there is no signal on a selected subset of totally encompassed channels or on the partially responsive channels. As more channels are removed, performance of the associated gain control circuit deteriorates gradually in proportion to the percentage of the channels removed. In regard, to the partially responsive channels A and E, the filter may be designed such that the combined signal strength is equivalent to one totally encompassed channel. Thus, while none of the totally encompassed channels may have signal, there may be sufficient signal from the sum of the two channels A and E to adequately operate the automatic gain control circuit of the present invention. Also, the roll-off characteristic of the filter may spill over into other channels below and above channels A and E respectively such that there may be some limited contribution to a detected power level from these channels and the cost of the filter may be minimized.

Thus, a filter may be designed which encompasses a large number of channels commonly used by CATV system operators. The CATV system operator may employ this system without regard to whether or not each of the channels is being used to provide signal. Furthermore, the system operator may, in fact, remove one or more of the channels from service at times, without concern for upsetting the operation of the system.

Many of the principles discussed in connection with the design of automatic gain control circuits in FIGS. 9 and 10 of copending U.S. patent application Ser. No. 269,719 are applicable to the design of the gain control devices described in FIGS. 5(a) and 5(b). For example, the variable attenuation unit 230 may comprise a dual gate field effect transistor circuit. Also, the slope characteristic of variable slope network 505 of FIG. 5(b) may be linear, may be selected from slope networks depending on the distribution plant, may be interpolated or even downloaded to the microprocessor 260 from the headend.

Figure 7:
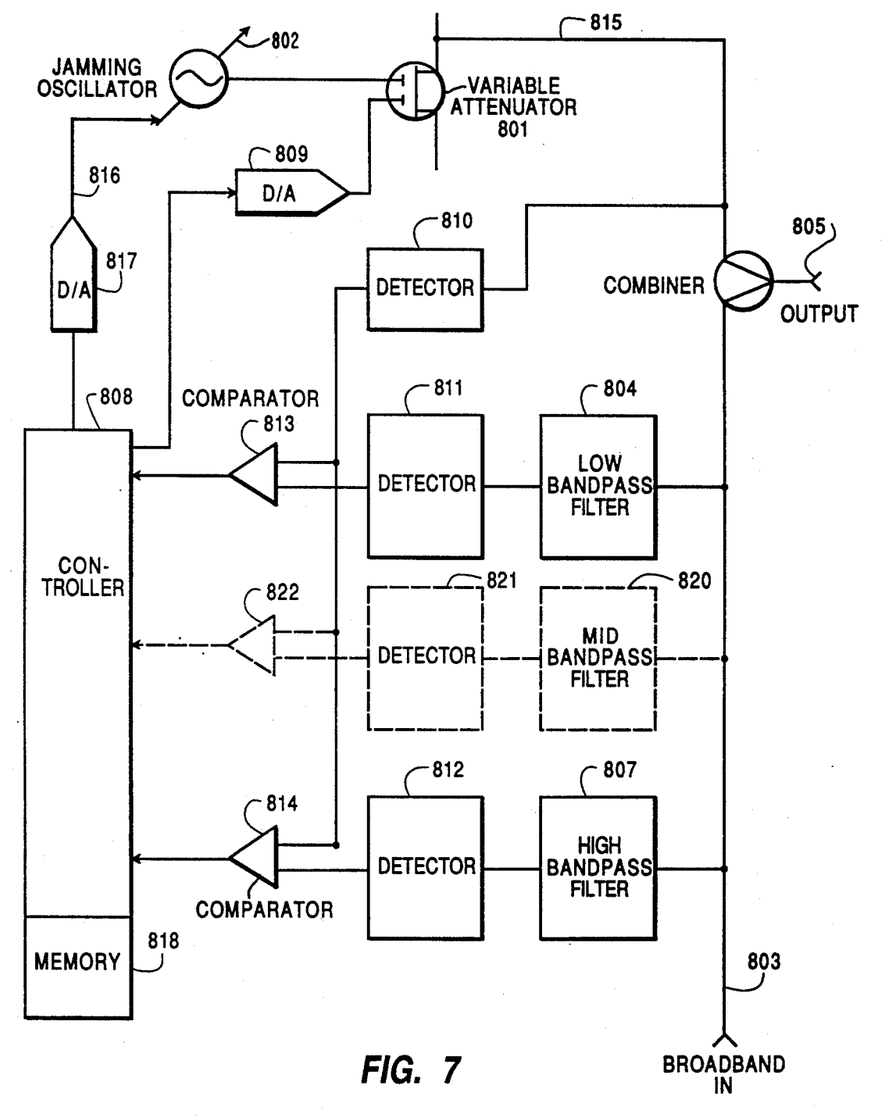
FIG. 7 is a reproduction of FIG. 10 of U.S. application Ser. No. 269,719 showing another embodiment of an automatic gain control circuit but, in which embodiment, the output of a jamming oscillator 802 is regulated to match a sampled picture carrier.

Also, many of the principles of design of a bandpass filter described in this application may be applicable to the design of sampling filters 804, 807 and 820 shown in FIG. 10 of U.S. application Ser. No. 269,719. FIG. 10 is shown in this application as FIG. 7 for the purpose of suggesting that a mid bandpass filter 820 and a controller 808 may be additionally incorporated into the gain control circuit of FIG. 5(b) to interpolate an appropriate slope characteristic for slope network 505.

Interdiction or jamming of transmission over alternative mediums to coaxial cable such as fiber optic cable or over-the-air radio frequency transmission can easily be accomplished, especially for those fiber optic cable television arrangements operating over approximately the same RF television bands as conventional coaxial cable CATV distribution systems. In such instances, appropriate circuit changes, for example, changes of cable termination impedance and operating frequencies may be required but are well within the scope of the present invention which is limited in scope only by the claims which follow.

What is claimed is:

1. Automatic gain control apparatus for use in an interdiction cable television system for automatically matching the power level of a broadband television signal transmitted to a subscriber to a reference power level, the reference power level providing a predetermined constant level at the subscriber's premises, the gain control apparatus comprising:

variable gain means for adjusting the power level of the broadband television signal to match the reference power level responsive to a control input signal, said variable gain means receiving the broadband television signal at an input and generating an adjusted broadband television signal at an output;

first filter means for filtering a portion of said adjusted broadband television signal output from the variable gain means, said first filter means passing an adjacent band of at least two channels from said adjusted broadband television signal;

first level detector means for detecting the power level of the broadband television signal and for outputting a signal representative thereof;

differencing means for outputting the control input signal to the variable gain means representative of the power level difference between the reference power level and the detected power level; and said control signal causing said adjustment means to adjust said broadband television signal in a direction which attempts to null said power level differences.

2. The automatic gain control apparatus of claim 1, further comprising:

controller means for controlling the signal power level of the output of a variable local jamming signal oscillator means for jamming television channels to fall within a predetermined range of the reference power level.

3. The automatic gain control apparatus of claim 2, wherein said controller means, responsive to a command signal from a headend, sets the reference power level and adjusts the local jamming signal oscillator means output accordingly.

4. The automatic gain control apparatus of claim 1, the adjacent band of channels comprising a number N of such channels which are totally encompassed and at least two channels which are partially encompasses, such that the elimination of the signal from a subset of the N channels does not significantly effect operation of the automatic gain control apparatus.

5. The automatic gain control apparatus of claim 1 further comprising radio frequency splitter means receiving the output of the automatic gain control apparatus, the radio frequency signal splitter means for splitting the broadband television signal to a plurality of subscriber units for interdicting or jamming unauthorized channel transmissions to a subscriber associated with each subscriber unit.

6. The automatic gain control apparatus of claim 5, each output of the radio frequency splitter means including a termination equivalent to the impedance of an associated transmission medium.

7. The automatic gain control apparatus of claim 1, the output of the automatic gain control apparatus being connected to the input of a radio frequency splitter for splitting the broadband television signal to a plurality of subscriber units for interdicting or jamming unauthorized channel transmissions to a subscriber associated with each subscriber unit.

8. The automatic gain control apparatus of claim 1, further comprising second filter means for receiving a portion of the broadband television signal,
the first filter means for passing a low frequency passband to the detector,
the second filter means for passing a high frequency passband to the detector.

9. The automatic gain control apparatus of claim 1, further comprising second filter means for receiving a portion of the broadband television signal, variable slope network means coupled between the variable gain means and the first and second filter means and second level detector means coupled to the output of the second filter means, the second detector means providing a control signal for controlling the slope provided by the variable slope network means.

10. The automatic gain control apparatus of claim 9 further comprising a third filter means for receiving a portion of the broadband television signal, and a third level detector coupled to the output of the third filter means, the third filter means for passing a midrange frequency passband to the third detector means, the second filter means passing a high frequency passband to the second detector means, the outputs of the second and third detector means for controlling the slope provided by the variable slope network means.

11. Automatic gain control apparatus for automatically matching the power level of a broadband television signal transmitted toward a subscriber of an interdiction cable television system to a predetermined reference power level, the automatic gain control apparatus comprising:
variable gain means for receiving the broadband television signal and adjusting the power level of the broadband television signal to match the predetermined reference level responsive to a control signal,
filter means for passing a portion of the broadband television signal output of the variable gain means, the portion encompassing at least two adjacent television channels,
level detector means for detecting the power level of the passed portion of the broadband television signal and providing an output signal representative thereof, and
control means for comparing the output signal of the level detector means with the reference power level and providing the control signal to the variable gain means.

12. The gain control apparatus according to claim 11, the portion passed by the filter means comprising:
a number N of adjacent television channels which are totally encompassed, N being greater than or equal to two, and two channels which are partially encompassed.

13. Automatic gain control apparatus of an interdiction cable television system, the CATV system including co-located common circuitry, shared by a plurality of subscriber units, the automatic gain control apparatus comprising:
variable gain means for receiving a broadband television signal and for adjusting the power level of the broadband television signal transmitted toward a subscriber of the CATV system to a predetermined reference power level responsive to a control signal and
control means for comparing the power level of the output of the variable gain means with the predetermined reference power level and for providing the control signal to the variable gain means,
the output of the variable gain means being coupled to radio frequency signal splitter means for splitting the output of the variable gain means to the plurality of subscriber units.

14. The automatic gain control method of claim 13 comprising the initial step of setting the reference power level.

15. A method of automatically controlling gain of a broadband television signal for use in an interdiction CATV system comprising the steps of:
a) measuring the power level of the broadband television signal at the output of variable gain means, wherein the power level measuring step comprises the steps of filtering the broadband television signal so as to pass at least two adjacent television channels and measuring the power level of the passed portion of the broadband television signal;
b) comparing the measured power level with a predetermined reference power level, the reference power level being the sum of the signal attenuation between the variable gain means and a subscriber premises and a power level desired at the subscriber premises,
c) determining the difference between the measured power level and the reference power level and
d) adjusting the gain of the variable gain means in proportion to the determined difference; in a manner which attempts to null the difference.

16. The automatic gain control method of claim 13 further comprising the step:
e) distributing the output of the variable gain means to a plurality of subscribers.

17. The automatic gain control method of claim 16 further comprising the step of:
f) setting a power level of a jamming or interdiction signal to fall within a predetermined range of the reference power level.

* * * * *